US012286159B2

(12) United States Patent
Butukuri et al.

(10) Patent No.: US 12,286,159 B2
(45) Date of Patent: *Apr. 29, 2025

(54) SIDE-IMPACT CRASH STRUCTURE

(71) Applicant: Zoox, Inc., Foster City, CA (US)

(72) Inventors: Ramanjaneya Reddy Butukuri, Union City, CA (US); Michael Curno Orr, San Francisco, CA (US); Thomas Andrew Stoddart, Mountain View, CA (US); Ashley Williams, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/650,913

(22) Filed: Feb. 14, 2022

(65) Prior Publication Data

US 2022/0161858 A1 May 26, 2022

Related U.S. Application Data

(63) Continuation of application No. 16/717,928, filed on Dec. 17, 2019, now Pat. No. 11,286,002.

(51) Int. Cl.
*B62D 21/15* (2006.01)
*B62D 31/02* (2006.01)
*B62D 63/02* (2006.01)

(52) U.S. Cl.
CPC .......... *B62D 21/157* (2013.01); *B62D 31/025* (2013.01); *B62D 63/025* (2013.01)

(58) Field of Classification Search
CPC ... B62D 21/157; B62D 31/025; B62D 63/025
(Continued)

(56) References Cited

U.S. PATENT DOCUMENTS 5,741,026 A * 4/1998 Bonnville ............ B62D 29/008
280/288
6,672,635 B2 * 1/2004 Weissenborn .......... B60R 19/18
296/187.02
(Continued)

FOREIGN PATENT DOCUMENTS

EP 1840006 A1 * 10/2007 ........... B62D 21/157
EP 2091786 A1 8/2009
(Continued)

OTHER PUBLICATIONS https://www.math.net/oblique-angle (Year: 2021).*
(Continued)

*Primary Examiner* — Amy R Weisberg
*Assistant Examiner* — Dana D Ivey
(74) *Attorney, Agent, or Firm* — Lee & Hayes, P.C.

(57) ABSTRACT

A side-impact crash structure may be positioned proximate an end of a vehicle to reduce impact forces imparted to an occupant during a side collision. The side-impact crash structure may include energy absorbers positioned on lateral sides of the vehicle between the passenger compartment and a longitudinal end of the vehicle. The energy absorbers may be configured to absorb impact forces over a limited ridedown distance (the distance over which the deceleration occurs) to prevent damage to both the occupants and one or more components or systems of the vehicle. The energy absorbers can be configured to deform along an oblique axis of the vehicle under a compressive force. The side-impact crash structure may include one or more load spreaders disposed between the energy absorbers that disperse the impact force to other portions of the vehicle.

20 Claims, 10 Drawing Sheets

(58) Field of Classification Search
USPC .................. 296/187.12, 209, 193, 7, 193.07; 293/155
See application file for complete search history.

(56) References Cited

U.S. PATENT DOCUMENTS

| | | | | |
|---|---|---|---|---|
| 8,833,839 | B2* | 9/2014 | Young | B62D 25/025 296/187.08 |
| 9,045,030 | B2* | 6/2015 | Rawlinson | B60L 50/66 |
| 9,505,442 | B2* | 11/2016 | Wu | B60K 1/04 |
| 9,545,952 | B2 | 1/2017 | Sakaguchi et al. | |
| 10,232,697 | B2* | 3/2019 | Hara | B60K 1/04 |
| 10,293,860 | B1* | 5/2019 | Cooper | B62D 25/025 |
| 10,370,040 | B1* | 8/2019 | Cooper | B62D 21/157 |
| 11,286,002 | B2* | 3/2022 | Butukuri | B62D 21/157 |
| 2007/0144851 | A1* | 6/2007 | Ginja | B60R 19/18 188/371 |
| 2012/0181803 | A1 | 7/2012 | Snell et al. | |
| 2018/0265136 | A1 | 9/2018 | Baccouche | |
| 2018/0312200 | A1 | 11/2018 | Kawase et al. | |
| 2018/0345777 | A1* | 12/2018 | Birnschein | B60W 10/08 |
| 2021/0101641 | A1* | 4/2021 | Kim | B62D 27/023 |
| 2021/0179179 | A1 | 6/2021 | Butukuri et al. | |

FOREIGN PATENT DOCUMENTS

| | | | | |
|---|---|---|---|---|
| FR | 2789955 | A1 | 8/2000 | |
| JP | 2020527924 | A * | 9/2020 | |
| JP | WO2019224973 | A1 | 5/2021 | |
| KR | 20120062217 | A | 6/2012 | |
| RU | 46463 | U1 | 7/2005 | |
| WO | 2017075523 | A2 | 5/2017 | |
| WO | WO-2019224973 | A1 * | 11/2019 | B62D 25/02 |

OTHER PUBLICATIONS

The International Preliminary Report on Patentability for PCT Application No. PCT/US20/64552, mailed Jun. 30, 2022.
International Search Report and Written Opinion mailed Mar. 18, 2021 for PCT application No. PCT/US20/64552, 10 pages.
Office Action for U.S. Appl. No. 16/717,928, mailed on Aug. 17, 2021, Butukuri, "Side-Impact Crash Structure", 8 Pages.
Extended European Search Report issued Apr. 26, 2024 by the European Patent Office for related Application No. EP 20901496.8 (10 pages).
PCT Search Report and Written Opinion mailed Mar. 18, 2021 for related International Application No. PCT/US20/64552, 10 pages.
European Search Report mailed Jan. 29, 2024 for related European Application No. 20901496.8, a foreign counterpart to U.S. Pat. No. 11,286,002, 12 pages.
Official Notice of Rejection issued by the Japan Patent Office for related Japanese Application No. 2022-534345, dated Jan. 7, 2025 (7 pages).

* cited by examiner

SIDE-IMPACT CRASH STRUCTURE

CROSS-REFERENCE TO RELATED APPLICATIONS

This Application a continuation of and claims priority to U.S. patent application Ser. No. 16/717,928, filed Dec. 17, 2019, and entitled "Side-Impact Crash Structure," which is incorporated herein by reference in its entirety.

BACKGROUND

Traditional vehicles are designed to provide protection to passengers during side-impact collisions. In a traditional passenger vehicle, where all occupants face in the direction of forward motion of the vehicle, there are several structures that protect an occupant during a side-impact crash, including the sill, door pillar or frame, and mounting structure for the passenger seats. These structures generally absorb energy produced by a side impact. In a vehicle with a carriage seating configuration where occupants face toward one another these structures are not in the same position relative to the occupants and therefore may not provide adequate energy absorption during a collision.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
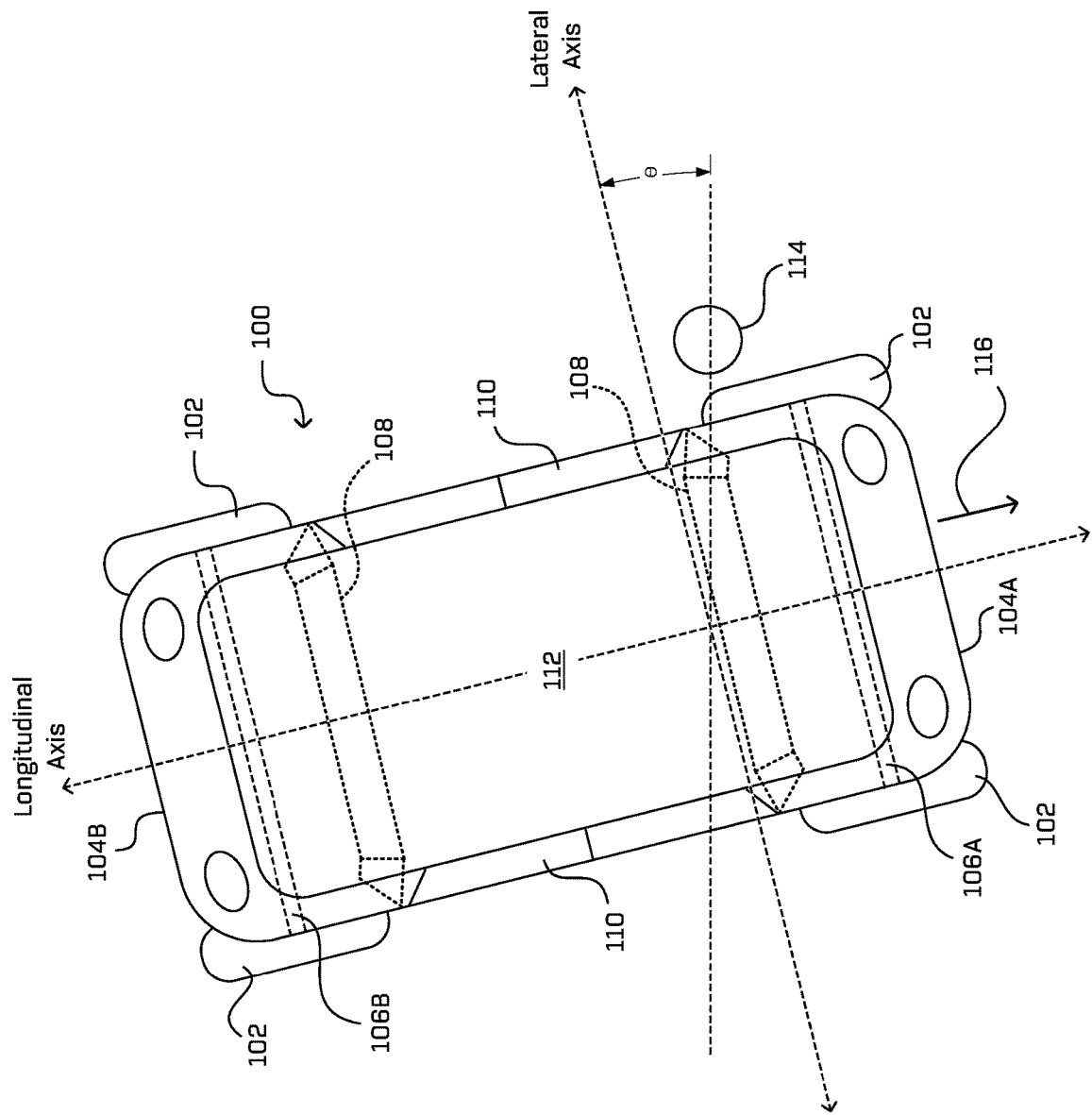
FIG. 1 is an overhead view of an example vehicle having a side-impact crash structure.

As mentioned above, occupants of a vehicle with a carriage-seating configuration are not positioned near traditional side-impact crash structures such as the sill or door frame. The sill, also referred to the rocker, is the body section of the vehicle positioned below the base of the door openings. In traditional vehicle seating, the occupants may be positioned toward the center of the vehicle, which is proximate or directly above the sill. In a traditional seating configuration, the sill helps to absorb and distribute a side-impact force in the vicinity of the occupants. In a vehicle configured for carriage seating, the occupants may be seated forward or rear of the door, door frame, and the longitudinal ends of the sill. Further, in vehicles configured for carriage seating there may be limited distance between the occupants and the exterior of the vehicle over which the vehicle can absorb the crash energy.

Vehicles undergo rigorous safety tests to help ensure the safety of occupants in a crash. One such test is a side-impact crash test, FMVSS 214 Dynamic Side Impact Protection—Rigid Pole Side Impact Test. In this example side-impact crash test, the vehicle is struck by a rigid pole when traveling around 32 kph at around 75° to the vehicle's longitudinal axis. The pole is configured to strike the vehicle proximate the center of gravity of the vehicle occupant's head. In a vehicle with a traditional seating configuration, the pole strikes the middle portion of the vehicle in proximity to the sill and door frame. In a vehicle with a carriage-seating configuration, the car may strike proximate an end of the vehicle, beyond the longitudinal end of the sill.

This application relates to a side-impact crash structure configured to be positioned proximate an end of a passenger vehicle to reduce the force absorbed by an occupant during a side collision and/or to protect a battery, drivetrain, or other systems of the vehicle. The side-impact crash structure may include energy absorbers positioned on lateral sides of the vehicle between the passenger compartment and a longitudinal end of the vehicle (e.g., a front or rear of the vehicle). In some examples, the side-impact crash structures may be disposed between the longitudinal ends of a sill of the vehicle and the longitudinal ends of the vehicle, proximate the passenger compartment. The energy absorbers are configured to minimize the force applied to an occupant with a limited ride-down distance (the distance over which the deceleration occurs) to prevent damage to both the occupant and one or more components or systems of the vehicle. The energy absorbers can be configured to deform along an oblique axis of the vehicle under a compressive force. As described herein, such energy absorbers may be designed based on particular geometric configurations, compositions of materials, or combinations thereof to promote such deformations. The side-impact crash structure may include one or more load spreaders disposed between the respective energy absorbers and the passenger compartment, a battery casing, or other structure of the vehicle to distribute impact forces imparted to the energy absorber to a larger area of the passenger compartment, battery casing, or other structure of the vehicle. In some examples, a portion of the vehicle body or drive assembly frame interposed between each of the energy absorbers and a battery casing of the vehicle may act as a load spreader. In some examples, each of the load spreaders may have a surface area contacting the battery casing that is larger than a surface area of the respective energy absorber contacting the load spreader. As with the energy absorbers, such load spreaders may comprise particular geometries, compositions of materials, or combinations thereof to promote such force distribution. In at least some examples, such energy absorbers and load spreaders may be integrally formed and comprise a single member. The crash structure may additionally or alternatively include one or more plates, casings, cross-members, beams, and/or other structural members directly or indirectly coupled between the energy absorbers to provide one or more load paths to further transmit or distribute the impact forces to the body or frame of the vehicle. In some examples, the load path structures are coupled to (and/or integrally formed with) the load spreading structure, which distributes the impact force from the energy absorber to the load paths.

In some examples, the vehicle includes two axles where each axle is positioned between the passenger compartment and an end of the vehicle. In some examples, the energy absorbers are positioned between one of the axles and the passenger compartment. The vehicle may comprise a battery at least partially enclosed by a battery casing. In some examples, a portion of the battery casing is positioned between the energy absorbers of the side-impact crash structure such that the battery casing acts as a load spreader for a force applied to one of the energy absorbers. In some examples, there is a space or gap between the battery casing and the battery to allow for some deformation of the battery casing without damage to the battery during a collision.

In some examples, the vehicle includes a drive assembly coupled to an end of the passenger compartment. The drive assembly may include an axle of the vehicle and a pair of wheels. In some examples, the drive assembly includes a motor, gearbox, and/or other drivetrain components coupled to the axle to propel the vehicle. In some examples, the drive assembly includes the battery and battery casing. The energy absorbers of the side-impact crash structure may be coupled directly or indirectly to the drive assembly and may be positioned outboard of the battery casing. In some examples, the side-impact crash structure also includes a load spreading structure, such as those described above, disposed between the energy absorber and the battery casing.

In some examples, the side-impact crash structure may be used on a vehicle that is bidirectional (i.e., where both longitudinal ends of the vehicle may be the leading end of the vehicle depending on the direction of travel). A bidirectional vehicle may have a side-impact crash structure positioned at one or both ends of the vehicle.

In some examples, the energy absorbers are formed from a plastically deformable material such as aluminum, steel, or other metals, carbon fiber, polymers, plastics, foams, or combinations of the foregoing. In some examples, the energy absorbers include an outer wall. The outer wall can be divided into multiple cells by one or more webs. In some examples, a first side of the outer wall may be shorter than a second side of the outer wall, where the first side of the outer wall is close to a longitudinal end of the vehicle than the second side of the outer wall. In some examples, at least a portion of the outer wall extends at an oblique angle relative to a lateral axis of the vehicle (the lateral axis of the vehicle being perpendicular to a direction of travel of the vehicle). By orienting the energy absorbers at this oblique angle, the crash structure is able to absorb more energy from collisions impacting the vehicle from a front and side of the vehicle. In some examples, the oblique angle is between about 0° and about 30° relative to the lateral axis of the vehicle, and in some examples, the oblique angle is between about 10° and about 20°. In one particular example, the oblique angle is approximately 15° relative to the lateral axis of the vehicle. The cells of the energy absorber can form a variety of shapes including a square, rectangle, triangle, hexagon, octagon, or trapezoid. In some examples, the cells can form an open-cell or honeycomb structure. In some examples, the outer wall and/or the webs between each cell may have a uniform thickness of between about 2 mm and 5 mm. The outer wall and the webs between the cells may have a same thickness or different thicknesses. The open cell construction allows the energy absorber to crush or otherwise deform, thereby absorbing energy of the collision, without intruding on other systems and structures of the vehicle (e.g., battery, drive train, passenger compartment, etc.).

In some examples, the energy absorber may be formed by extrusion. The energy absorbers can also be formed using other manufacturing processes including, for example, casting, injection molding, three-dimensional printing (or other additive manufacturing techniques), or machining. Energy absorbers that are formed by casting or injection molding may have outer wall thicknesses and/or webs that vary along the length of the energy absorber. For example, the thickness of the walls of the energy absorber may be thicker at the proximal end of the energy absorber than at the distal end of the energy absorber. This may allow the energy absorber to provide varying resistance or energy absorption over the distance that it deforms. For instance, the energy absorber may be configured so that the thinner portion of the energy absorber deforms relatively easily at first and progressively increases as the deformation increases. This may minimize the forces experienced by the vehicle and occupant during lower impact collisions while allowing the energy absorber to absorb more energy later in the crash pulse.

While this application describes examples in which the side-impact crash structure is applied to a bidirectional autonomous vehicle, this application is not limited to bidirectional vehicles or autonomous vehicles. The side-impact crash structure described in this application can be applied to other non-bidirectional and/or non-autonomous vehicles. The vehicle may be powered by one or more internal combustion engines, electric motors powered by one or more power supplies (e.g., batteries, hydrogen fuel cells, etc.), or any combination thereof. The vehicle in this application is depicted as having four wheels/tires. However, other types and configurations of vehicles are contemplated, such as, for example, vans, sport utility vehicles, crossover vehicles, trucks, buses, agricultural vehicles, construction vehicles, and trains vehicles. While this application describes and depicts a side-impact crash structure positioned at or near the end of the vehicle, the side-impact crash structure described in this application can be positioned anywhere along the length of the vehicle. While this application describes and depicts a vehicle having a carriage-seating arrangement, the side-impact crash structure disclosed can be applied to vehicles having different seating arrangements, including where all passengers face the direction of forward motion of the vehicle, where all passengers face opposite the direction of forward motion, and/or where one or more passengers face a lateral side of the vehicle.

The techniques and systems described herein may be implemented in a number of ways. Example implementations are provided below with reference to the figures.

Figure 2A:
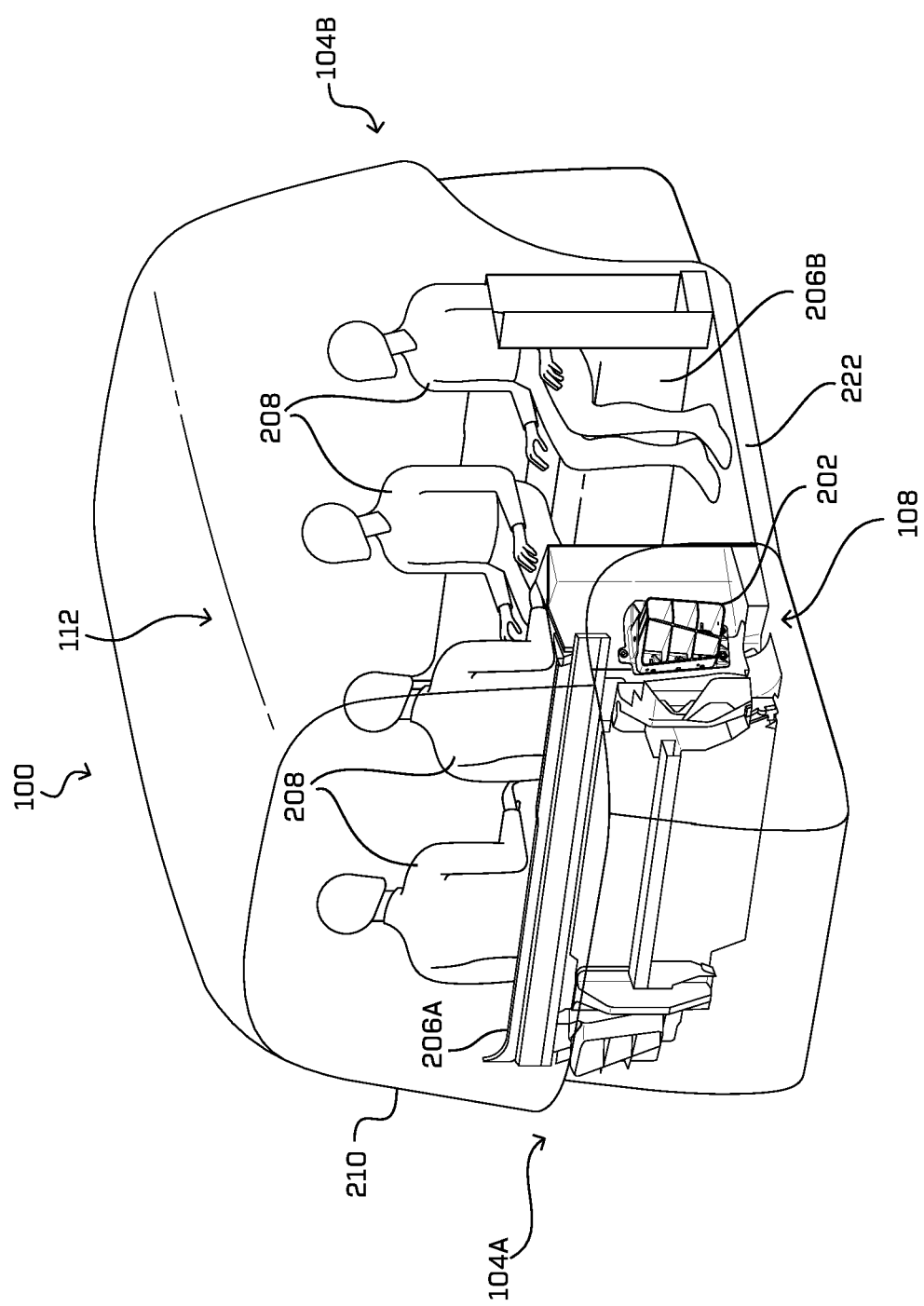
FIG. 2A is a perspective view of an example vehicle having a side-impact crash structure.

FIG. 1 depicts an example vehicle 100 having a longitudinal axis generally aligned with a direction of travel when the vehicle is traveling straight (not turning) and a lateral axis perpendicular to the longitudinal axis. As shown the vehicle 100 includes four wheels 102 with two wheels/tires positioned at each longitudinal end 104 of the vehicle 100. In some examples, the vehicle 100 may include multiple axles, including a first axle 106A extending between the wheels 102 at the first longitudinal end 104A of the vehicle and a second axle 106B extending between the wheels at the second longitudinal end 104B of the vehicle. The first axle 106A and/or the second axle 106B may be substantially parallel to the lateral axis of the vehicle 100. The first axle 106A and/or the second axle 106B may comprise straight axles that extend between the right and left wheels 102, or may comprise separate drive shafts associated with each wheel and supported by independent suspension that allow each wheel on the same axle to move vertically independently. The vehicle 100 may include doors 110 positioned proximate the center of the length of the vehicle. The doors 110 may be surrounded by door pillars or frames. The vehicle 100 may include a sill structure positioned beneath the door opening (the sill structure is illustrated in FIG. 2A). The vehicle 100 includes a side-impact crash structure 108 that is configured to provide protection to occupants in the vehicle 100 from a side impact where the point of impact beyond the door 110 and sill of the vehicle. The side-impact crash structure 108 may be positioned proximate a longitudinal end 104 of the vehicle 100, for example between the longitudinal end of the sill and the longitudinal end of the vehicle. In some examples, side-impact crash structures 108 may be disposed between each axle of the vehicle and a passenger compartment 112 of the vehicle.

FIG. 1 depicts an example side-impact collision between the vehicle and a pole 114. The pole 114 in FIG. 1 shows an example side-impact position that the side-impact crash structure is configured to protect against. In this example, the vehicle 100 is traveling in the direction of arrow 116, making longitudinal end 104A the leading end (or "front") of the vehicle in this example. The pole 114 depicts an impact to the leading, left corner of the vehicle 100 in the vicinity of or slightly behind a wheel 102 of the vehicle 100. The side-impact crash structures 108 may include energy absorbing structures (described with reference to FIGS. 2A-2B and 3A-3C) angled at an oblique angle θ relative to the lateral axis of the vehicle to receive an impact force from a direction toward the front corner of the vehicle (like the angle of impact of the pole 114 in this example). In some examples, the energy absorbing structures may be disposed proximate to all four corners of a vehicle.

FIG. 2A is a perspective view of the vehicle 100 showing the side-impact crash structure 108 positioned proximate a longitudinal end 104A of the vehicle 100. The wheels are omitted from the vehicle in this drawing to better illustrate the crash structure. Additionally, the first longitudinal end 104A is shown transparent to illustrate the locations of the crash structure 108 relative to the passenger compartment 112. The side-impact crash structure 108 may be positioned between the sill 222, which runs along the bottom of the door opening of the vehicle 100, and the longitudinal end 104A of the vehicle and between the leading axle and the passenger compartment of the vehicle. The side-impact crash structure 108 may include energy absorbers 202 positioned on lateral sides of the vehicle 100. In some examples, the side-impact crash structure 108 includes an energy absorber 202 on each lateral side of the vehicle 100. In other examples, the side-impact crash structure 108 may include multiple energy absorbers 202 on each lateral side of the vehicle 100 or may include energy absorber(s) on only one lateral side of the vehicle. In some examples, the side-impact crash structure 108 may include a first energy absorber disposed proximate a first corner of the vehicle, a second energy absorber disposed proximate a second corner of the vehicle, a third energy absorber disposed proximate a third corner of the vehicle, and a fourth energy absorber disposed proximate a fourth corner of the vehicle. The side-impact crash structure 108 may be positioned longitudinally outboard of the passenger compartment 112. For example, the side-impact crash structure 108 may be positioned between the passenger compartment 112 and the longitudinal end 104 of the vehicle 100. In some examples, the side-impact crash structure 108 may be positioned in between the wheels proximate a longitudinal end 104 of the vehicle. The energy absorber(s) 202 may be positioned inward and/or behind a wheel of the vehicle 100. The energy absorber(s) 202 may be positioned and angled to receive and absorb a side impact that is in the direction of the center-of-gravity of the head of an occupant of the vehicle.

In some examples, the passenger compartment 112 of a body 210 of the vehicle includes two seats 206, including a first seat 206A and a second seat 206B, oriented facing one another (e.g. a "carriage seating" configuration). In other examples, any number of one or more seats may be disposed in a vehicle at locations and/or orientations other than what is indicated in FIG. 2A. For instance, though illustrated as two bench style seats 206 which can accommodate multiple occupants 208, in some examples, multiple individual bucket-style seats may be disposed in a vehicle. An occupant(s) 208 in the first seat 206A may be positioned by the first seat to face an occupant(s) in the second seat 206B. When in this configuration, the occupants' 208 heads may be positioned in proximity to the outer corners of the passenger compartment 112. The side-impact crash structure 108 is configured to protect the occupants 208 in this position.

In some examples, because of the bidirectionality of the vehicle 100, each of the first seat 206A and the second seat 206B may, at different times, be a leading or trailing seat, as determined by the direction of travel of the vehicle. Also, each of the first seat 206A and second seat 206B may, at different times, be a forward-facing seat or a rear-facing seat, as determined by direction of travel of the vehicle 100. Therefore, bidirectional vehicles may include a side-impact crash structure 108 proximate both the first longitudinal end 104A and second longitudinal end 104B of the vehicle to protect occupants in both the first seat 206A and the second seat 206B in side-impact crash scenarios. In other examples, the vehicle 100 may include a side-impact crash structure 108 on only one longitudinal end 104 of the vehicle 100. Also, the side-impact crash structure 108 can be positioned at both longitudinal ends 104 of a vehicle that is not bidirectional.

Figure 2B:
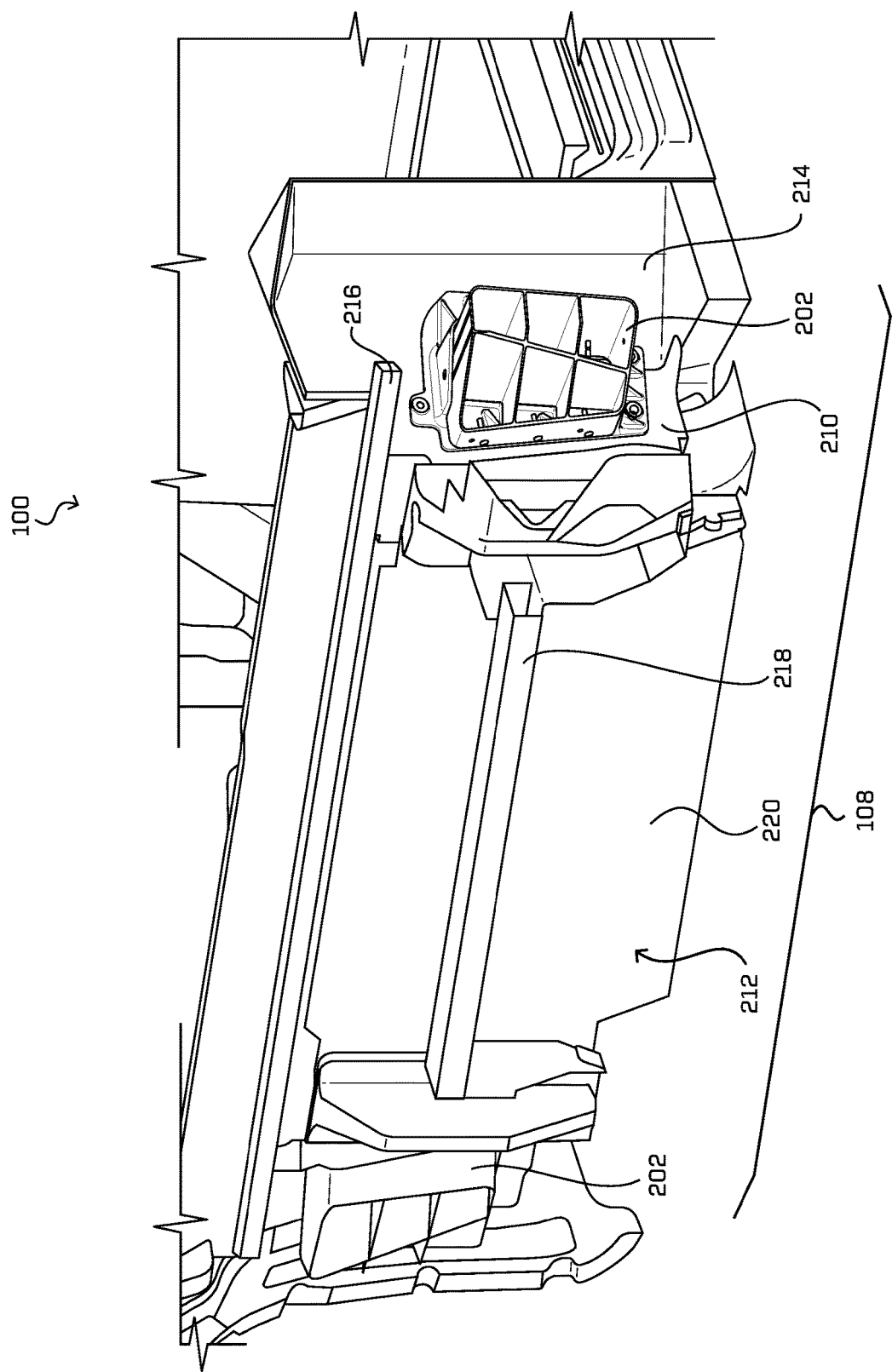
FIG. 2B is a perspective view of an example side-impact crash structure.

FIG. 2B is a perspective view of the side-impact crash structure 108. As described above, the side-impact crash structure 108 may include energy absorbers 202 positioned on the lateral sides of the vehicle 100. The energy absorbers 202 are configured to deform in response to a compressive force, discussed in further detail below. In some examples, a portion of the energy absorber 202 extends at an oblique angle relative to the lateral axis of the vehicle 100. As mentioned above, the energy absorber 202 may be oriented to extend at an oblique angle θ relative to the lateral axis of the vehicle to receive an impact force that is not completely horizontal to the vehicle 100. The side-impact crash structure 108 may also include one or more load spreaders configured to transfer cross-car impact loads and act as a back-up structure for the energy absorber 202. A variety of structures may act as load spreader(s) for the side-impact crash structure 108. The load spreader(s) may be directly or indirectly coupled to the energy absorber(s) 202. Energy produced by an impact force to the energy absorber(s) 202 is transferred to the load spreader(s), which disperse the force to a larger area throughout the vehicle. In some examples, the load spreader(s) are coupled in between or in proximity to the energy absorbers 202 on each lateral side of the vehicle 100. In some examples, load spreading structures are formed from a more rigid material and/or structure than the energy absorbers 202 and do not deform under the same force as the energy absorbers 202.

In some examples, a tub or body 210 of the vehicle 100 acts as a load spreader. The energy absorber(s) 202 may be coupled directly or indirectly to the body 210. Impact force that is not absorbed by the energy absorber(s) 202 may be transferred to the body 210. The energy absorber(s) 202 may be coupled to the body 210 at a thicker, stiffer, and/or reinforced portion of the body of the vehicle so as to distribute the impact force throughout the vehicle 100. In some examples, the vehicle 100 includes a drive assembly 212 coupled to a body of the vehicle containing the passenger compartment. In some examples, a drive assembly frame 214 can act as a load spreader in addition to or instead of the body 210. The drive assembly frame 214 may be coupled to the body 210 of the vehicle 100.

In addition to dispersing the impact energy through their own structure, the load spreaders, such as the body 210 and/or drive assembly frame 214, may spread the impact force to other structures that serve as additional load transfer paths for the impact energy. Additional load path structures may include cross-members or beams. For example, the body of the vehicle may include an elongated body cross-member 216 that is formed integrally with or coupled to the body 210. The drive assembly frame 214 can include an elongated drive assembly cross-member 218. The body cross-member 216 and drive assembly cross-member 218 may be indirectly coupled to the energy absorbers 202 through one or more load spreading structures such as, but not limited to, those described above and may provide additional cross-body load paths for the impact force. A side-impact crash structure 108 contemplated by this application may include all or some of these load spreading structures and/or load path structures.

In some examples, the vehicle 100 includes a battery coupled to one or more motors to propel the vehicle. In some examples, the battery and/or the motor(s) are disposed in the drive assembly 212. The battery may be fully or partially contained in the drive assembly frame 214. To protect the battery from impact damage, the battery may be fully or partially surrounded by a battery casing 220. In some examples, the battery casing 220 may be coupled to or integral with the body 210 or the drive assembly frame 214 of the vehicle 100. In some examples, a portion of the battery casing 220 is positioned in between or in proximity to the energy absorber(s) 202 and acts as a load path. In some examples, the energy absorber(s) 202 may be positioned outboard of the battery casing 220. In such examples, the battery casing 220 may help transfer crash loads across the vehicle and/or to other structural components of the vehicle 100. The battery casing 220 may be relatively more rigid than the energy absorber(s) 202 so that the battery casing 220 does not deform substantially during transfer of loads, thereby protecting the vehicle battery from impact during the collision. The portion of the battery casing 220 positioned in between or in proximity to the energy absorber(s) 202 may be reinforced to provide greater structural integrity than other portions of the battery casing 220. For example, one or more walls of the battery casing 220 may include a steel plate, ribs, gussets, trusses, or other reinforcing structures. In some examples, there is a gap or distance between the battery and the battery casing 220 to accommodate the ride-down distance of an impact, shown in detail below. The gap may be between about 0 mm and about 10 mm. In some examples, the gap is between about 2 mm and about 6 mm. The side-impact crash structure 108 is configured to limit the ride-down distance from an impact to avoid damage to the battery. In some examples, other structures including fuel tanks, motors, controllers, computers, cooling systems, etc. can be protected from impact damage using a casing similar to the battery casing 220 and/or side-impact crash structures such as those described herein. The energy absorber(s) 202 are designed to deform during a collision to provide a crush zone to absorb energy during a collision, while the vehicle body 210, battery casing 220, drive assembly frame 214, body cross-member 216, and drive assembly cross-member 218 constitute backup structures and are designed to distribute and transfer loads throughout the vehicle without substantial deformation. Thus, the energy absorber(s) 202 may include one or more initiators to initiate deformation, may be more ductile, thinner wall thickness, and/or may have a lower rigidity than the backup structures.

Figure 3A:
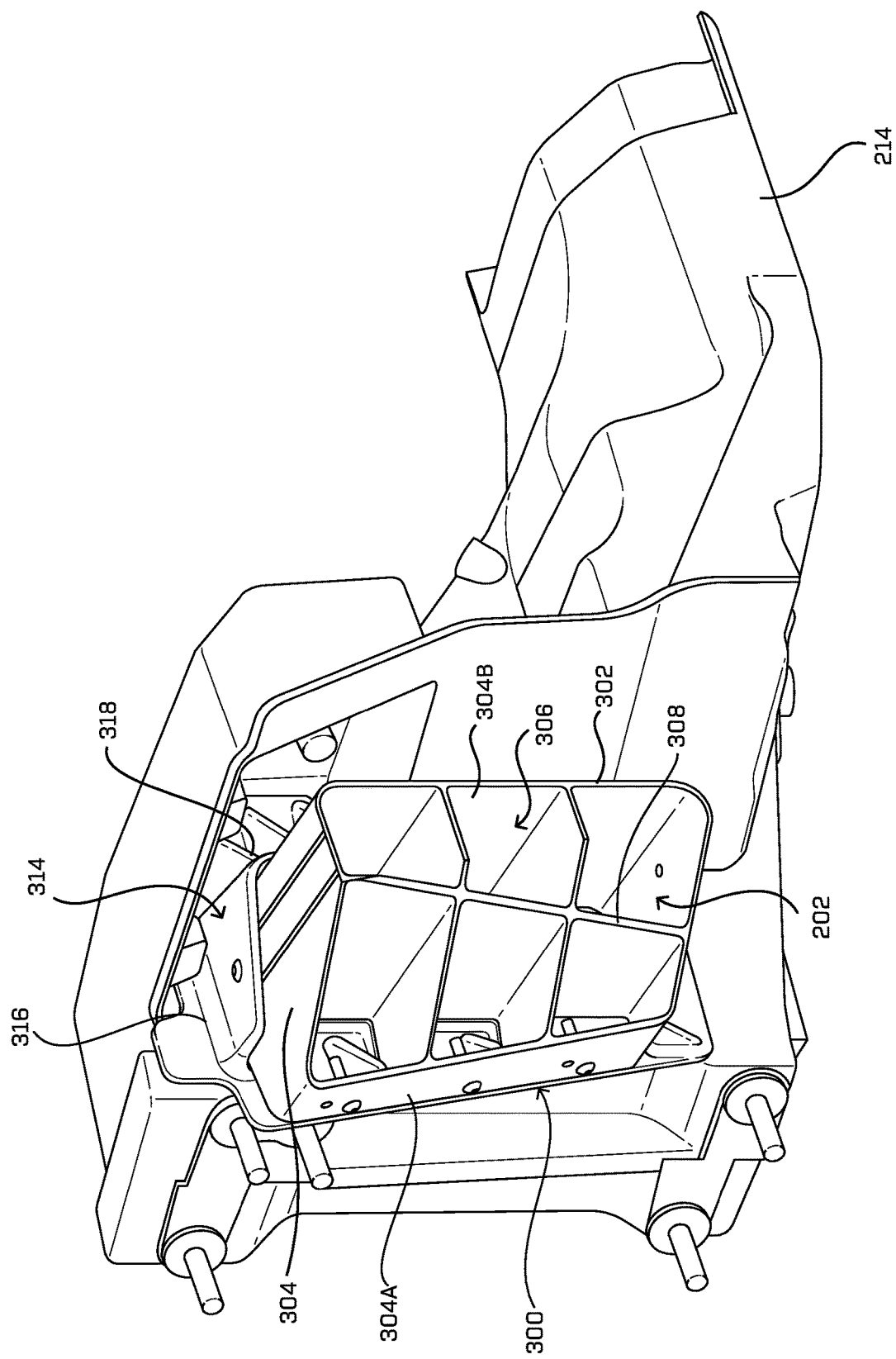
FIG. 3A is a perspective view of an example energy absorber for a side-impact crash structure, attached to a vehicle.
Figure 3B:
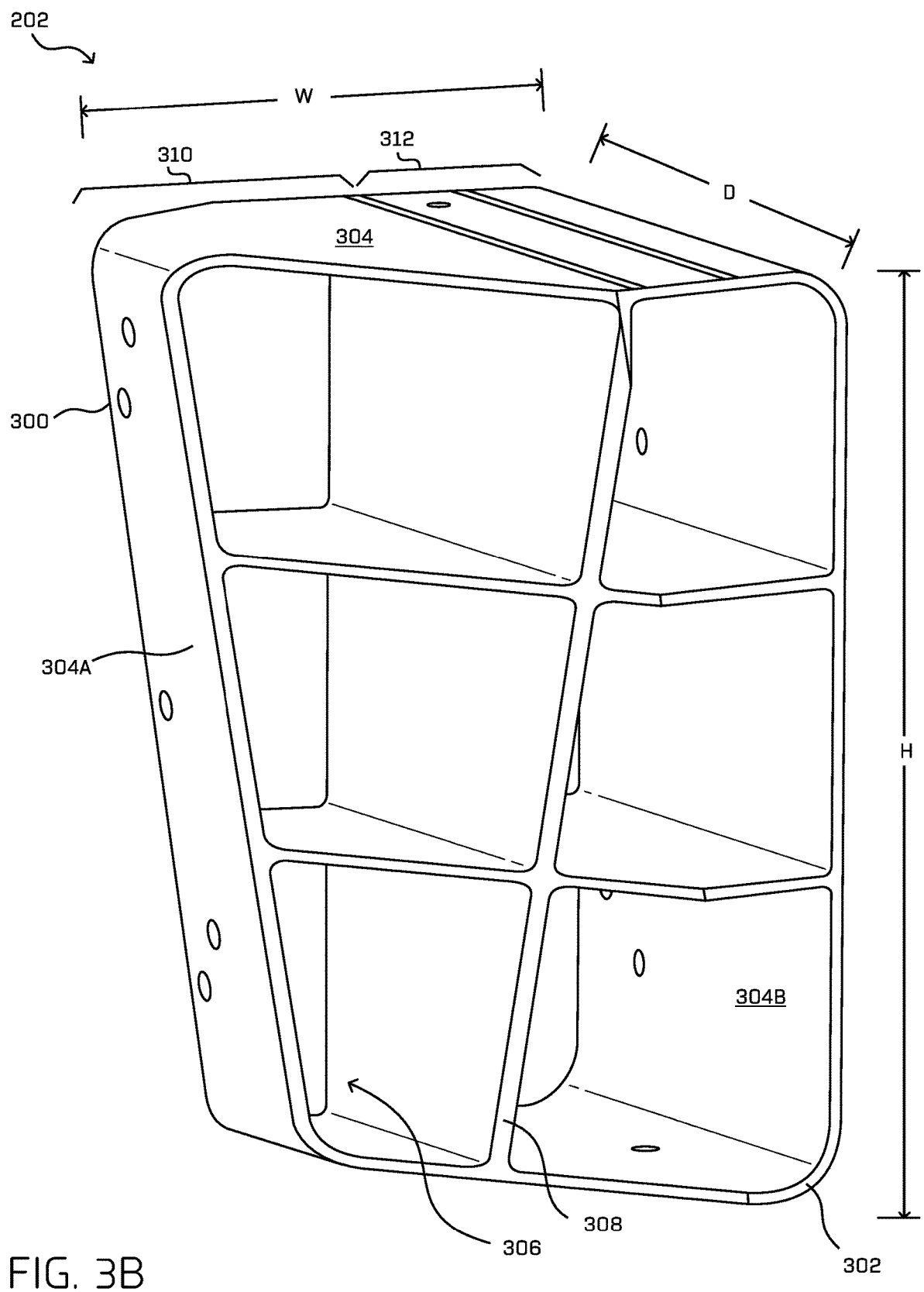
FIG. 3B is a perspective view of an example energy absorber for a side-impact crash structure.
Figure 3C:
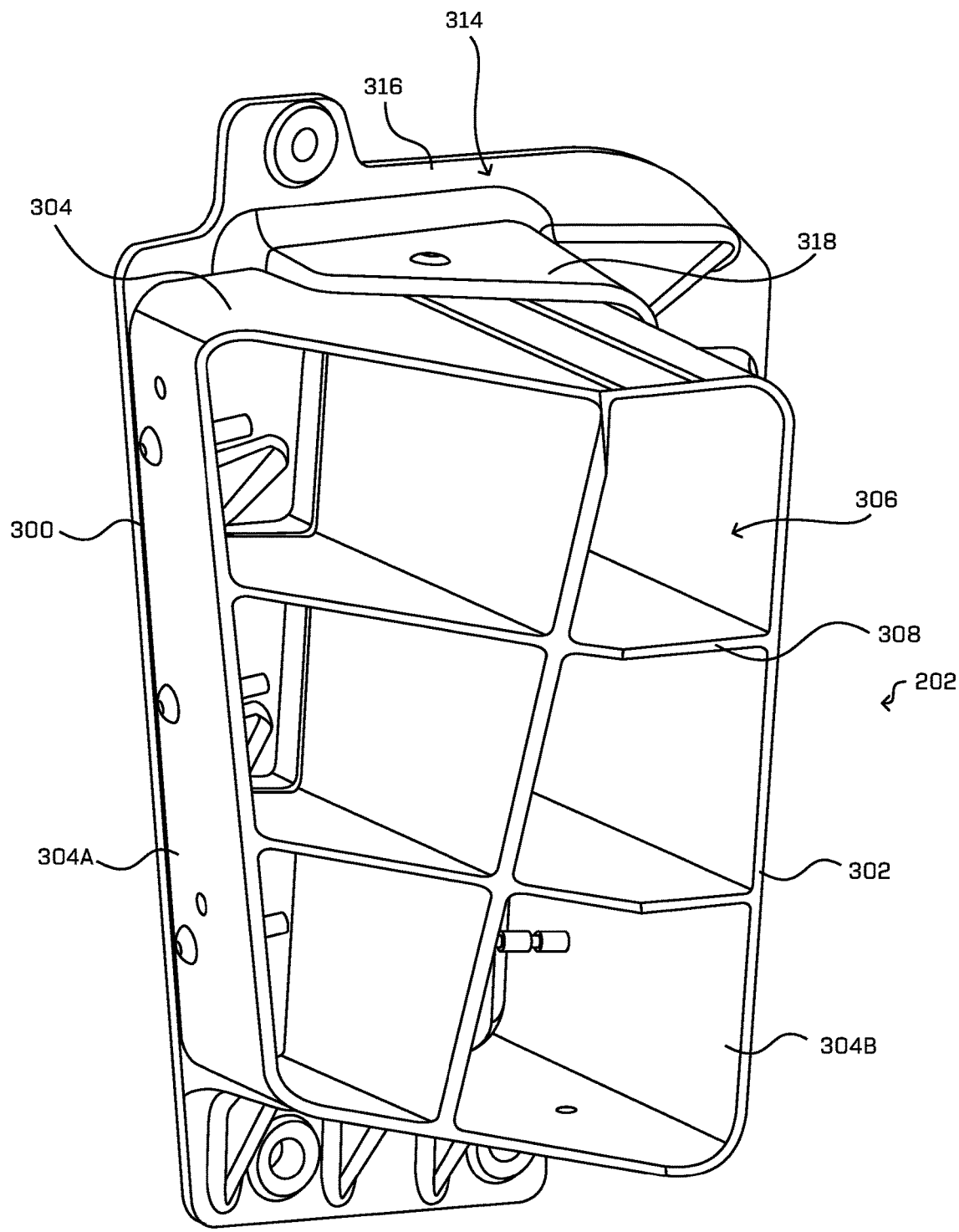
FIG. 3C is a perspective view of the example energy absorber of FIG. 3B attached to a support structure.

FIGS. 3A-3C are perspective views of an energy absorber 202. As shown in FIG. 3A, the energy absorber 202 is coupled to the drive assembly frame 214 of a vehicle, while in FIG. 3B the energy absorber is shown on its own. In some examples, the energy absorber 202 includes an inboard edge 300 that is proximal and attached to a portion of the vehicle, an outboard edge 302 that is distal from the vehicle, and an outer wall 304. The outer wall 304 may comprise a circumferential wall that bounds a perimeter of the energy absorber 202. The outer wall 304 in this example includes a first side 304A and a second side 304B. The energy absorber 202 may be formed from a plastically deformable material such as aluminum, steel, other deformable metals, carbon fiber, a polymer, plastic, or foam, or a combination thereof. Depending on the material, the energy absorber can be made by extrusion, casting, injection molding, three-dimensional printing, machining, combinations of the foregoing, or other manufacturing techniques. In some embodiments, the energy absorber 202 is formed from extruded aluminum such as A356 Alloy aluminum. In some examples, the crush force to completely deform the energy absorber 202 is approximately equal to the peak crush force of the load spreader(s) described above.

In some examples, as best shown in FIG. 3B, the energy absorber 202 may have a width W of between about 100 mm and about 300 mm, a height H of between about 200 mm and 400 mm, and a depth D of between about 25 mm and about 300 mm. In some examples the energy absorber 202 may have a width W of between about 150 mm and about 200 mm, a height H of between about 250 mm and 300 mm, and a depth D of between about 50 mm and about 250 mm. In some examples, the dimensions (W, H, and/or D) may be larger or smaller than the examples above. Also, in some examples, the width W, height H, and/or depth D may vary from one part of the energy absorber 202 to another. For instance, as shown in FIGS. 3A-3C, the energy absorber is wider at top than at a bottom, and has a greater depth on the right side than on the left side. It should be noted that the energy absorber on the opposite lateral side of the vehicle and the energy absorber on the opposite longitudinal end of the vehicle would be mirror images of that shown in FIGS. 3A-3C.

The energy absorber includes an outer wall 304 having an inboard edge 300 for attachment to the vehicle. The energy absorber 202 depicted in FIGS. 3A-3C has a flat (or substantially planar) inboard edge 300 or circumference for attachment to a flat mounting surface of the vehicle. However, in some examples, the inboard edge 300 of the energy absorber 202 can be angled or curved to complement the portion of the vehicle to which it is attached. The energy absorber 202 may include an extrusion extending outward from the inboard edge 300 to an outboard edge 302. The span between the inboard edge 300 and the outboard edge 302 defines an outer wall 304 of the energy absorber. The outer wall 304 may be divided into multiple cells 306 by one or more webs or cell walls 308 to form an open cell structure. The energy absorber 202 depicted in FIGS. 3A-3C has six cells 306 having substantially rectangular outer perimeters. In other words, the cells 306 in this example are rectangular prisms with the longitudinal ends being open. However, the cells 306 of the energy absorber 202 may have any other perimeter shape including, for example, a square, triangle, hexagon, octagon, or trapezoid. The outer wall 304 and/or webs or cell walls 308 that form the cells 306 may have a uniform thickness. In some examples, the outer wall 304 and/or cell walls 308 have a thickness of between about 2 mm and 5 mm. In other examples, the cell walls 308 may have a thickness of between about 0.5 mm and 10 mm. In some examples, the thickness of the outer wall 304 may be the same or different than the cell walls 308. In some examples, the outer wall 304 and/or the cell wall 308 thickness need not be uniform. Also, while the energy absorber 202 depicted in FIGS. 3A-3C has six cells 306. In some examples, the energy absorber 202 may have more or fewer cells. The energy absorber 202 may have as many cells 306 as allowed by the size, material, and method of manufacturing the energy absorber. The cells 306 may be generally uniform in size (e.g., have approximately a same cross-sectional area, volume, etc.) or may vary. In some examples, cells 306 of different sizes and shapes can be used in a single energy absorber 202. In some examples, one or more initiators (e.g., holes, depressions, bends, etc.) or crumple zones may be disposed on the energy absorber 202 to initiate deformation of the energy absorber 202 during a collision to minimize damage to other vehicle systems.

As discussed above, the outer wall 304 and/or the cell walls 308 may extend at an oblique angle to the longitudinal axis of the vehicle. In some examples, a first portion 310 of the outer wall 304 is beveled such that the outboard edge 302 of the first portion 310 is at an oblique angle relative to the inboard edge 300, and a second portion 312 of the outer wall 304 is uniform such that the outboard edge 302 of the second portion 312 is generally parallel to the inboard edge 300. As a result of first portion 310 being beveled, a first side 304A of the outer wall 304 may be shorter than a second side 304B of the outer wall 304. In some examples, the oblique angle of the first portion 310 provides clearance for the vehicle wheels, suspension, steering, and other systems of the vehicle, while providing significant side-impact crash protection.

FIG. 3C illustrates the energy absorber 202 coupled to a mounting bracket or support structure 314 by one or more fasteners. The support structure 314 may be configured to receive and couple to the energy absorber 202 and the support structure 314 may be coupled directly or indirectly to the vehicle. In some examples, the inboard edge 300 of the energy absorber 202 is attached to a mounting plate 316 of the support structure 314. The mounting plate 316 of the support structure 314 may be attached to the vehicle. In some examples, the support structure 314 may include a sidewall 318 extending outward from the mounting plate 316. The sidewall 318 of the support structure 314 may wrap around and reinforce outer wall 304 of the energy absorber 202 and may help transfer and spread loads from the energy absorber 202 to the rest of the vehicle. In some examples, the sidewall 318 of the support structure 314 reinforces the second side 304B (the deeper side) of the energy absorber 202. The support structure 314 may help to control the deformation of the energy absorber 202 and distribute impact energy to other load spreading/transferring structures.

Figure 4A:
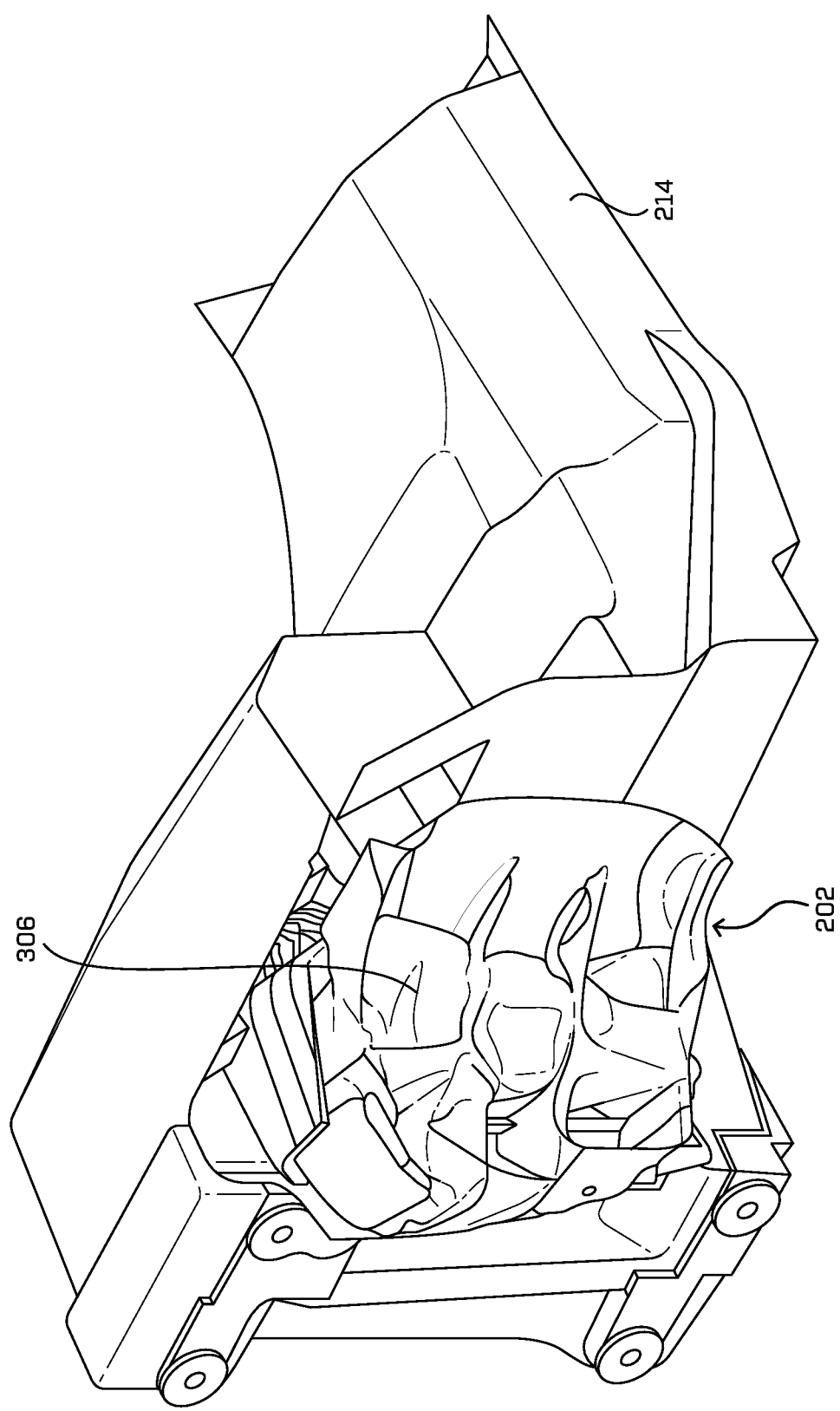
FIG. 4A is a perspective view showing deformation of an example energy absorber of a side-impact crash structure during a collision.

FIG. 4A is a perspective view of the energy absorber 202 after it has been deformed or crushed under a compressive force. As shown, the energy absorber 202 crushes axially as a result of the side-impact force. In some examples, the cells 306 of the energy absorber 202 may collapse as the energy absorber is subject to a compressive force. The energy absorber 202 absorbs the energy of the impact by collapsing and deforming. The design of the energy absorber 202, including its size, materials, cell structure, shape, and angle are selected to maximize the energy absorbed during the ride-down distance (distance it takes for the vehicle to come to rest after impact) in order to minimize the force applied to occupants 208 and to protect both vehicle components and the passenger compartment 112. The force not absorbed by the energy absorber 202 can be spread by one or more load spreaders to additional load paths as describe above.

Figure 4B:
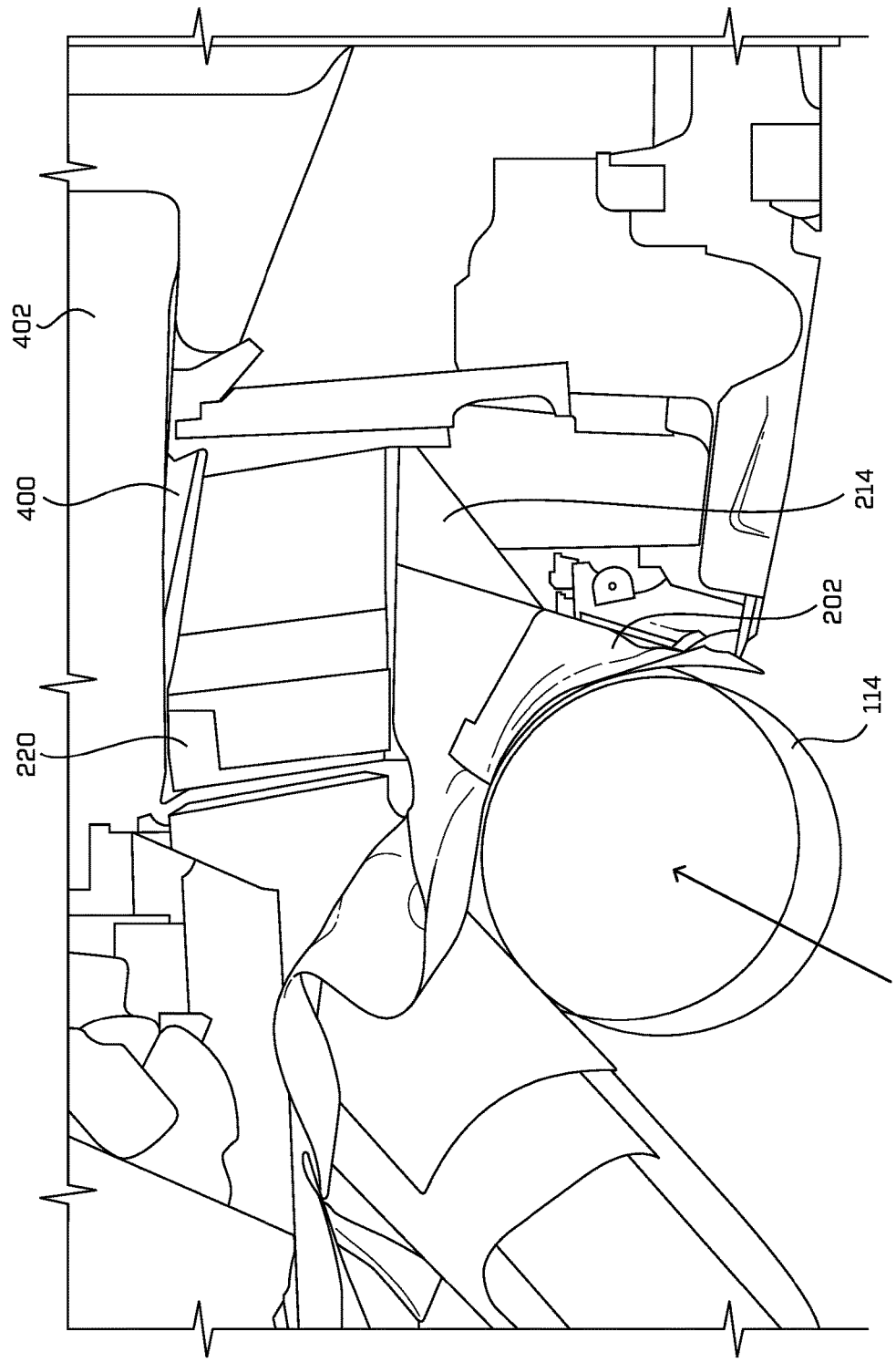
FIG. 4B is an overhead view showing deformation of an example side-impact crash structure during a collision.

FIG. 4B is an overhead view of the side-impact crash structure 108 subject to an impact from the pole 114 as described above with reference to FIG. 1. The ride-down distance can be measured by the distance the pole 114 intrudes into the vehicle 100. As shown, deformation of the energy absorber 202 accounts for the majority of the ride-down distance. Thus, the intrusion into other vehicle structures is minimized. As shown in FIG. 4B, deformation of the drive assembly frame 214 and the battery casing 220 is minimized due to the energy absorbed by the energy absorber 202. Additionally, as deformation of the energy absorber 202 increases, the reaction force applied by the energy absorber 202 increases, thereby transferring more force through the load spreading structures to other load paths (e.g., body 210, drive assembly frame 214, battery casing 220, body cross-member 216, and/or drive assembly cross-member 218). In this example, there is a gap 400 between the battery casing 220 and the battery 402, as described above. This gap 400 may be large enough to accommodate for a ride-down distance that is larger than the deformation of the energy absorber 202 and drive assembly frame 214, battery casing 220, and/or other structures positioned between the energy absorber and battery 402, such that the battery casing 220 may deform into the gap 400, but not damage the battery 402. In some examples, the side-impact crash structure 108 is configured such that the ride-down distance is less than the distance between the exterior of the vehicle and the battery 402 or the occupant 208.

In general, the crash structures described herein are designed to absorb energy of collision over a relatively short ride-down distance, while minimizing intrusion of a pole or other obstacle into the passenger compartment, battery, drivetrain, or other systems of the vehicle. In some examples, the crash structures described herein may be configured to absorb energy of a collision over a ride-down distance of less than 400 mm, or less than 350 mm. In some examples, the crash structures described herein may be configured to absorb energy of a collision over a ride-down distance of between about 200 mm and about 300 mm. In some examples, energy absorbers described in this application may be designed to absorb energy over the ride-down distance in order to minimize a maximum force transmitted to an occupant and/or system of the vehicle while the vehicle is decelerated. Additionally, in some examples, the reaction force of the side-impact crash structure may increase with increased intrusion distance, thereby minimizing forces on occupants and vehicle systems for lower speed collisions while still absorbing more energy and transferring more energy to other portions of the vehicle to stop further intrusion during higher speed collisions.

Figure 5:
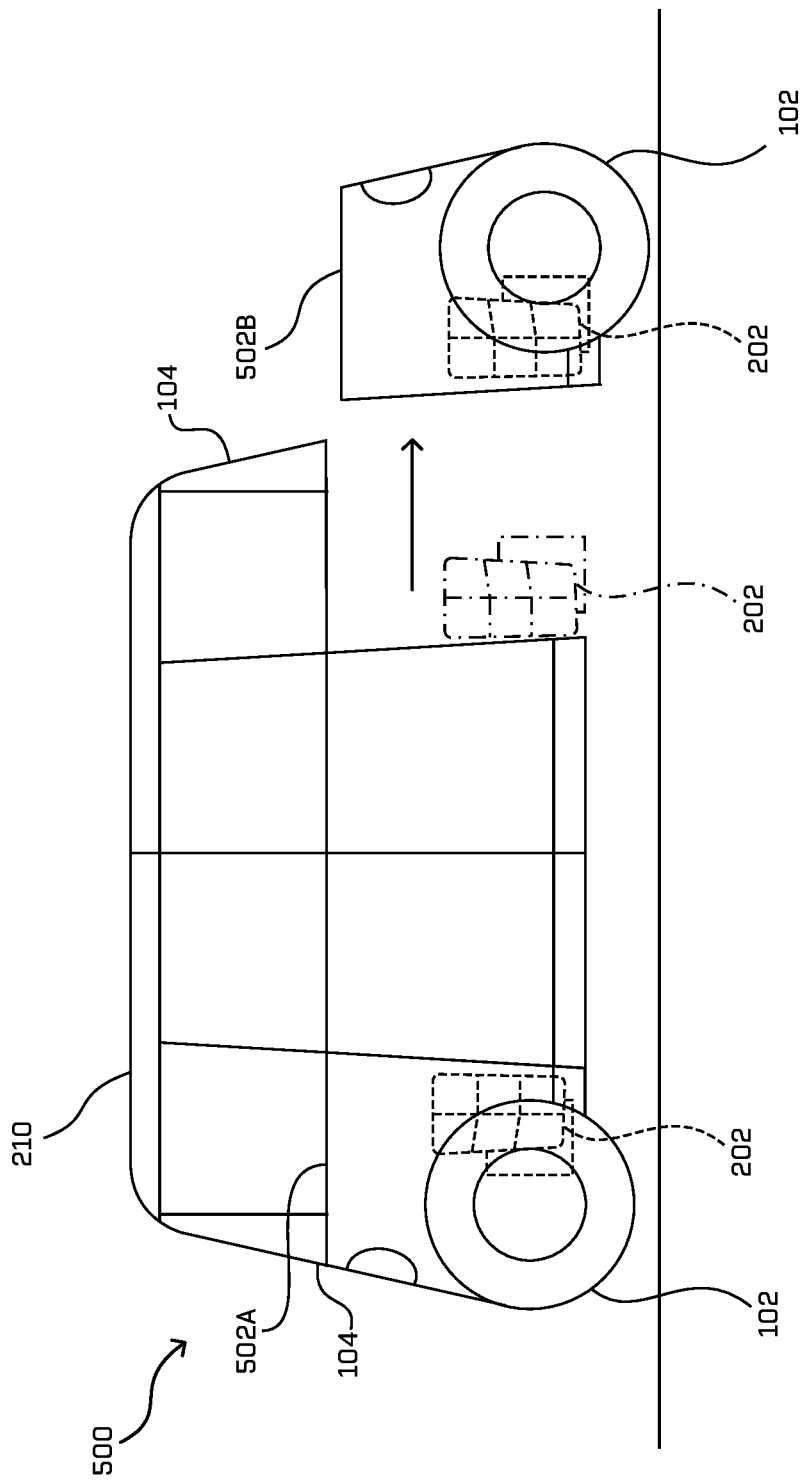
FIG. 5 is a schematic side view of an example vehicle having a side-impact crash structure.

FIG. 5 is a schematic view of a vehicle 500 comprising detachable drive assemblies 502 disposed at opposite longitudinal ends of the vehicle. FIG. 5 shows a first drive assembly 502a in an installed state and a second drive assembly 502b in an uninstalled state. In the assembled state, the drive assembly 502 is attached to the vehicle body 210. Each detachable drive assembly 502 may include wheels 102, axle 106, battery 402, motor(s), cooling system, steering system, braking system, and/or other vehicle systems to operate the vehicle. The detachable drive assemblies 502 are positioned at the respective ends 104 of the vehicle 500. In some examples, the vehicle 500 includes only one detachable drive assembly 502. In some examples, portions or all of the side-impact crash structure 108 may be coupled directly or indirectly to the detachable drive assembly 502. One such example of this is represented in FIG. 5 by the energy absorber 202 shown in dashed lines coupled to the detached second drive assembly 502b. For instance, the detachable drive assembly 502 may include any or all of the energy absorber(s) 202, battery casing 220, drive assembly frame 214, and/or drive assembly cross-member 218. In examples where the energy absorber(s) 202 are positioned on the detachable drive assembly 502, other portions of the vehicle 100 including the body 210 and body cross-member 216 may still function as load spreaders for the side-impact crash structure 108. In these examples, force is transferred from the energy absorber 202 to the vehicle body 210 via the coupling between the vehicle body and the drive assembly 502. In other examples, portions or all of the side-impact crash structure 108 may be coupled directly or indirectly to the body 210 or passenger compartment of the vehicle 500. This alternate configuration is represented in in FIG. 5 by the energy absorber 202 shown in dot-dashed lines coupled to the body 210 proximate the detached second drive assembly 500b. That is, the dashed line representation of the energy absorber(s) 202 shows one example configuration, and the dot-dash line representation of the energy absorber(s) 202 shows another example configuration of the side-impact crash structures according to this application.

Figure 6:
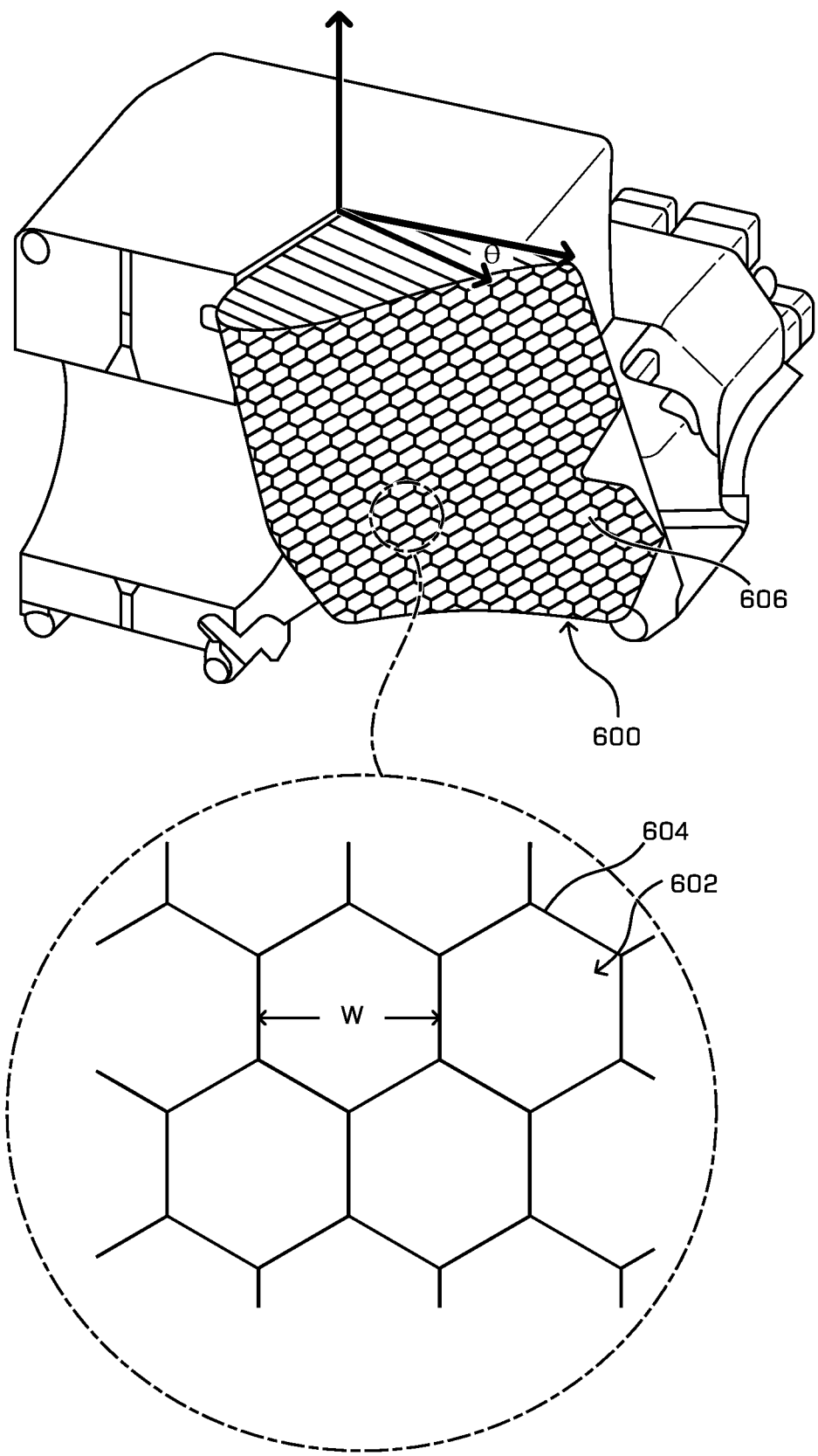
FIG. 6 is a perspective view of another example energy absorber for a side-impact crash structure.

FIG. 6 is a front perspective view of an energy absorber 600 according to another example embodiment. The energy absorber 600 may be formed of a honeycomb structure formed from an array of hollow cells 602 formed between walls 604. That is, the cells 602 may comprise prisms having hexagon perimeter or cross-section which may be open ended or closed. In some examples, the hollow cells 602 may have a width W of between about 10 mm and about 30 mm. The honeycomb energy absorber 600 may be formed from any of the materials described above for energy absorber 202. In some examples, the honeycomb energy absorber 600 is formed from TL091 Aluminum Alloy. In some examples, the outer wall 606 of the honeycomb energy absorber 600 may be curved such that it provides a variety of oblique angles for receiving a side impact. The outer wall 606 may be open to provide an open cell arrangement, or it may have a skin or surface layer covering the open ends of the cells 602. In some embodiments, the energy absorber 600 may be formed from injection molded composites. In this example, like the example of FIGS. 3A-3C, the cell walls 604 of the energy absorber 600 extend at an oblique angle θ relative to the lateral axis of the vehicle. However, in this example, the outer wall of the energy absorber 600 may extend at angles other than the oblique angle θ.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the claims.

Example Clauses

The following paragraphs describe various examples. Any of the examples in this section may be used with any other of the examples in this section and/or any of the other examples or embodiments described herein.

A: In some examples, a vehicle may comprise: a first longitudinal end, a second longitudinal end opposite the first longitudinal end, a first lateral side, and a second lateral side opposite the first lateral side; a passenger compartment positioned between the first longitudinal end and the second longitudinal end, wherein the passenger compartment comprises a seat proximate the first longitudinal end and facing toward the second longitudinal end; a first axle disposed between the first longitudinal end and the passenger compartment; a second axle disposed between the second longitudinal end and the passenger compartment; a first energy absorber disposed between the first axle and the passenger compartment on the first lateral side and configured to deform to absorb energy of a collision on the first lateral side, the first energy absorber comprising an open cellular structure; and a second energy absorber disposed between the first axle and the passenger compartment on the second lateral side and configured to deform to absorb energy of a collision on the second lateral side, the second energy absorber comprising an open cellular structure.

B: The vehicle of example A, wherein at least one of the first energy absorber or the second energy absorber comprises an outer wall divided into multiple cells by one or more webs.

C: The vehicle of any one of example A or B, wherein the outer wall and the one or more webs extend at an oblique angle relative to a lateral axis extending between the first lateral side and the second lateral side.

D: The vehicle of example C, wherein the oblique angle is between about 1° and 20°.

E: The vehicle of any one of examples A-D, wherein at least one of the first energy absorber or the second energy absorber comprises an extrusion.

F: The vehicle of any one of examples A-E, wherein at least one of the first energy absorber or second energy absorber comprises at least one of aluminum, steel, carbon fiber, or plastic.

G: The vehicle of any one of examples A-F, further comprising a drive assembly coupled to the passenger compartment at the first longitudinal end, the drive assembly including the first axle and a battery casing, wherein the first energy absorber and the second energy absorber are coupled laterally outboard of the battery casing.

H: The vehicle of any one of examples A-G, further comprising a load spreader disposed between the first energy absorber and a body of the vehicle.

I: The vehicle of any one of examples A-H, wherein the vehicle is a bidirectional vehicle and the seat comprises a first seat, the vehicle further comprising: a second seat proximate the second longitudinal end and facing toward the first longitudinal end; a third absorber disposed between the second axle and the passenger compartment of the first lateral side; and a fourth energy absorber disposed between the second axle and the passenger compartment on the second lateral side.

J: The vehicle of any one of examples A-I, wherein at least one of the first energy absorber or the second energy absorber is configured to deform along an oblique axis of the vehicle under a compressive force.

K: The vehicle of any one of examples A-J, further comprising a battery at least partially surrounded by a battery casing, wherein at least a portion of the battery casing is positioned between the first energy absorber and the second energy absorber, and wherein there is a space between the battery and the battery casing.

L: In some examples, a side-impact crash structure for a vehicle comprises: an elongated cross-member configured to extend along a lateral axis of the vehicle; a first energy absorber coupled to a first end of the cross-member, the first energy absorber comprising a first outer wall divided into multiple cells by a first web, wherein the first outer wall and the first web extend at a first oblique angle relative to the cross-member; and a second energy absorber coupled to a second end of the cross-member, the second energy absorber comprising a second outer wall divided into multiple cells by a second web, wherein the second outer wall and the second web extend at a second oblique angle relative to the cross-member.

M: The side-impact crash structure of example L, wherein a portion of at least one of the first energy absorber or second energy absorber comprises one of an open-cell structure or a honeycomb structure.

N: The side-impact crash structure of example M, wherein at least one of the first oblique angle or the second oblique angle is between about 0° and about 30°.

O: The side-impact crash structure of any one of examples L-N, wherein the cross-member has a rigidity greater than that of the first energy absorber and the second energy absorber.

P: The side-impact crash structure of any one of examples L-O, wherein at least one of the first energy absorber or second energy absorber comprises at least one of aluminum, steel, carbon fiber, or plastic.

Q: The side-impact crash structure of any one of examples L-P, wherein: the first outer wall of the first energy absorber comprises a circumferential wall defining a perimeter of the first energy absorber, the outer wall having a proximal end and a distal end; the first web is disposed within the circumferential wall and divides the first energy absorber into the multiple cells; an inboard edge of the first outer wall is disposed at the proximal end of the circumferential wall and is configured for attachment to the vehicle, the inboard edge having a substantially planar circumference; and an outboard edge disposed at the distal end of the circumferential wall, a first portion of the outboard edge being spaced a first distance from the inboard edge, and a second portion of the outboard edge being spaced a second distance from the inboard edge, the second distance being different than the first distance.

R: In some examples, an energy absorber for use in a side-impact crash structure comprises: an outer circumferential wall defining a perimeter of the energy absorber, the outer circumferential wall having a proximal end and a distal end; a web disposed within the outer circumferential wall and dividing the energy absorber into multiple cells; an inboard edge disposed at the proximal end of the outer circumferential wall and configured for attachment to a vehicle, the inboard edge having a substantially planar circumference; and an outboard edge disposed at the distal end of the outer circumferential wall, a first portion of the outboard edge being spaced a first distance from the inboard edge, and a second portion of the outboard edge being spaced a second distance from the inboard edge, the second distance being different than the first distance.

S: The energy absorber of example R, wherein the energy absorber is made at least one of aluminum, steel, carbon fiber or foam.

T: The energy absorber of any one of examples R or S, wherein a cell of the multiple cells is generally prismatic in shape and has a perimeter shape that is substantially square, rectangular, triangular, hexagonal, octagonal, or trapezoidal.

While the example clauses described above are described with respect to particular implementations, it should be understood that, in the context of this document, the content of the example clauses may also be implemented using other methods, devices, systems, and/or other implementations.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While features, components, and operations may be presented in a certain arrangement, configuration, and/or order, the arrangement, configuration, and/or order may be rearranged, combined, or omitted without changing the function of the systems and methods described.

What is claimed is:

1. A vehicle comprising:
an elongated cross-member extending along a lateral axis of the vehicle; and
an energy absorber configured above and physically separated from a sill of the vehicle on a side of the vehicle and coupled to an end of the elongated cross-member, the energy absorber comprising a side wall and multiple cells, wherein the side wall extends laterally to the vehicle at an oblique angle relative to the lateral axis of the vehicle.

2. The vehicle of claim 1, wherein the energy absorber is coupled to a drive assembly cross-member that extends latterly to the vehicle.

3. The vehicle of claim 2, further comprising a load spreading structure disposed between the energy absorber and the drive assembly cross-member.

4. The vehicle of claim 2, wherein the drive assembly cross-member has a rigidity greater than the energy absorber.

5. The vehicle of claim 1, wherein the energy absorber is configured substantially between a door of the vehicle and an axle of the vehicle.

6. The vehicle of claim 1, wherein the energy absorber is configured to provide protection to an occupant in the vehicle from a side impact above the sill.

7. The vehicle of claim 1, wherein the energy absorber is configured at least partially behind a wheel configured at an axle of the vehicle.

8. The vehicle of claim 1, further comprising a battery at least partially surrounded by a battery casing, the battery casing extending along a lateral axis of the vehicle proximate to the energy absorber, wherein the energy absorber is coupled to the end of the elongated cross-member outboard of the battery casing.

9. The vehicle of claim 8, wherein the energy absorber is configured substantially between the sill of the vehicle and an axle of the vehicle.

10. A side-impact crash structure for a vehicle comprising:
an elongated cross-member configured to extend along a lateral axis of the vehicle; and
an energy absorber configured above and physically separated from a floor of the vehicle on a side of the vehicle and coupled to an end of the elongated cross-member, the energy absorber comprising a side wall and multiple cells, wherein the side wall is configured to extend laterally to the vehicle at an oblique angle relative to the lateral axis of the vehicle.

11. The side-impact crash structure of claim 10, further comprising a load spreading structure disposed between the energy absorber and the elongated cross-member.

12. The side-impact crash structure of claim 10, wherein at least one cell of the multiple cells is generally prismatic in shape and has a perimeter shape that is substantially polygonal.

13. The side-impact crash structure of claim 10, wherein the side wall is divided into the multiple cells by one or more webs.

14. The side-impact crash structure of claim 13, wherein the oblique angle is between about 1° and 20°.

15. An energy absorber for use in a side-impact crash structure, the energy absorber comprising:
an outer circumferential wall defining a perimeter of the energy absorber, the outer circumferential wall having a proximal end and a distal end;
multiple cells disposed within the outer circumferential wall;
an inboard edge disposed at the proximal end of the outer circumferential wall and configured for attachment to a vehicle above and physically separate from a sill of the vehicle; and
an outboard edge disposed at the distal end of the outer circumferential wall and proximate to an axle of the vehicle, wherein the outer circumferential wall is configured to extend laterally to the vehicle at an oblique angle relative to a lateral axis of the vehicle.

16. The energy absorber of claim 15, wherein the inboard edge is configured for attachment to a cross-member configured between a first lateral side and a second lateral side of the vehicle.

17. The energy absorber of claim 15, wherein:
the outer circumferential wall comprises a first side wall of a first length and a second side wall of a second length;
the first side wall is substantially parallel to the second side wall; and
the first length is greater than the second length.

18. The energy absorber of claim 15, wherein the inboard edge has one of a substantially curved circumference or a substantially angled circumference.

19. The energy absorber of claim 18, wherein the multiple cells are configured to extend substantially parallel to the outer circumferential wall.

20. The energy absorber of claim 15, wherein the outer circumferential wall is divided into the multiple cells by one or more webs.

* * * * *